(12) United States Patent
Kuno et al.

(10) Patent No.: US 6,899,166 B2
(45) Date of Patent: May 31, 2005

(54) METHOD FOR PREVENTING CONTAMINATION OF HEAT EXCHANGER AND HEAT EXCHANGER USING THIS METHOD

(75) Inventors: Hitoshi Kuno, Kariya (JP); Yasushi Okamoto, Nagoya (JP); Tomomi Takagi, Nagoya (JP); Kengo Kobayashi, Nagoya (JP); Toshiya Nagasawa, Obu (JP); Kenichi Morita, 3-12-5, Kataseyama, Fujisawa-City, Kanagawa-Pref., 251-0033 (JP)

(73) Assignees: Denso Corporation, Kariya (JP); Kenichi Morita, Fujisawa (JP)

( * ) Notice: Subject to any disclaimer, the term of this patent is extended or adjusted under 35 U.S.C. 154(b) by 659 days.

(21) Appl. No.: 09/941,536

(22) Filed: Aug. 29, 2001

(65) Prior Publication Data

US 2002/0062951 A1 May 30, 2002

(30) Foreign Application Priority Data

Aug. 30, 2000 (JP) .................................. 2000-261091

(51) Int. Cl.⁷ ............................................. F28F 19/02
(52) U.S. Cl. .................................... 165/133; 165/134.1
(58) Field of Search ............................... 165/133, 134.1

(56) References Cited

U.S. PATENT DOCUMENTS

| | | | | |
|---|---|---|---|---|
| 3,336,099 A | * | 8/1967 | Czulak et al. ............ | 422/186.1 |
| 5,070,938 A | * | 12/1991 | Mizuno et al. .............. | 165/133 |
| 5,741,887 A | | 4/1998 | Morita et al. | |
| 5,904,990 A | * | 5/1999 | Stenger-Smith et al. .... | 428/457 |
| 5,922,466 A | * | 7/1999 | Angelopoulos et al. ..... | 428/418 |
| 5,976,419 A | * | 11/1999 | Hawkins et al. ............ | 252/512 |

FOREIGN PATENT DOCUMENTS

| | | |
|---|---|---|
| JP | A8-296992 | 11/1996 |
| JP | 9-175801 | * 7/1997 |
| JP | 10-316403 | * 12/1998 |

* cited by examiner

*Primary Examiner*—Teresa J. Walberg
(74) *Attorney, Agent, or Firm*—Harness, Dickey & Pierce, PLC (57) ABSTRACT

On the surface of a heat exchanging portion in a heat exchanger, a film made of a polyaniline is formed. When the heat exchanger operates, condensed water is adhered on the surface of the heat exchanger, and contacts the film made of the polyaniline. Accordingly, oxygen dissolved in the condensed water becomes active oxygen by the polyaniline, and organic substances contained in the condensed water is decomposed. Thus, an amount of organic substances attached to a surface of the heat exchanger can be reduced in low cost without equipment extension.

27 Claims, 5 Drawing Sheets

METHOD FOR PREVENTING CONTAMINATION OF HEAT EXCHANGER AND HEAT EXCHANGER USING THIS METHOD

CROSS-REFERENCE TO RELATED APPLICATION

This application is related to Japanese Patent Application No. 2000-261091 filed on Aug. 30, 2000, the contents of which are hereby incorporated by reference.

BACKGROUND OF THE INVENTION

1. Field of the Invention

The present invention relates to a heat exchanger used for radiation/cooling of an air conditioner, a refrigerator, a dehumidifier, or an automotive; and a method for preventing a heat exchanger from being contaminated.

2. Description of Related Art

Deodorizing techniques employed for a heat exchanger of an air conditioner or a refrigerator are disclosed, for example, in JP-A-8-296992. In this publication, there is proposed a heat exchanger for reducing adhesion and accumulation of organic substances causative of an odor by making use of the action of a photocatalyst, on the surface of the heat exchanger. In this heat exchanger, the photocatalyst is applied onto the surface of an aluminum fin of the heat exchanger by using a binder, and a ultraviolet lamp is disposed so as to permit exposure of the heat exchanger by its light.

The above-described technique however needs, in addition to an extra step for applying a photocatalyst on the surface of the heat exchanger, equipment extension such as disposal of a ultraviolet lamp. Accordingly, a cost increase is caused.

SUMMARY OF THE INVENTION

In view of the foregoing problems, it is an object of the present invention to provide a method for preventing contamination of a heat exchanger, which reduces an amount of organic substances attached to the surface of the heat exchanger in a low cost without equipment extension; and a heat exchanger using this method.

According to the present invention, for preventing contamination of a heat exchanger, a film which generates an active oxygen when contacting water is provided on the surface of a metal base material of the heat exchanger, thereby generating an active oxygen. Accordingly, it is possible to generate active oxygen simply by forming the film on the surface of the metal base material, and by bringing the film into contact with oxygen dissolved in water existing around the film. Oxidizing action of the generated active oxygen serves to decompose the organic substances adhered onto the surface of the metal base material. As a result, it is possible to reduce the amount of organic substances at a low cost without equipment extension.

preferably, it is possible to generate the active oxygen by bringing condensed water which has been generated on the surface of the metal base material by the operation of the heat exchanger, into contact with the film, and by activating oxygen dissolved in the condensed water.

The surface of the metal base material wetted by the condensed water is dried to prevent the contact of the film with the condensed water, so that generation of the active oxygen is terminated. At the same time, by drying the surface of the metal base material, an active-oxygen generating capacity can be regenerated. Accordingly, it possible to use the film in repetition.

Preferably, the film is made of an electron donating polymer. Therefore, it possible to donate electrons to the oxygen dissolved in water, particularly, in the condensed water, thereby converting the oxygen into active oxygen. As this electron donating polymer, a polyaniline or a derivative thereof can be used. In this case, contamination-preventing performance and sterilizing performance can be improved.

BRIEF DESCRIPTION OF THE DRAWINGS

Additional objects and advantages of the present invention will be more readily apparent from the following detailed description of a preferred embodiment when taken together with the accompanying drawings, in which.

DETAILED DESCRIPTION OF THE PRESENTLY PREFERRED EMBODIMENT

A preferred embodiment of the present invention will be now described with reference to the accompanying drawings. In this embodiment, the present invention is typically used for a heat exchanger.

Examples of each of synthesis process of a polyaniline which is a redox polymer and serves as an electron donating polymer, detection of generation of active oxygens (i.e., super oxide and hydrogen peroxide) due to the synthesized polyaniline, and detection of the decomposing performance of organic substances, will be described.

(Polyaniline Synthesis Process 1)

Within an ice-cooling bath, 0.50 ml of a 1 mol/l aqueous hydrochloric acid solution containing 12 g of ammonium persulfate is cooled sufficiently. The aqueous hydrochloric acid solution containing ammonium persulfate is slowly added to 300 ml of 1 mol/l aqueous hydrochloric acid solution containing about 2.8 g of aniline which solution had been also cooled. While cooling, the mixture is stirred for 1.5 hours. The solution is changed from colorless to greenish blue and a polyaniline represented by the below-described formula (1)–(4).

Formula (1):

wherein, "A" indicates an anion, "n" indicates an integer in a range of 2–5000, "x" and "y" are the numbers which simultaneously satisfy the following equations: x+y=1 and 0≦y≦0.5.

The product obtained by the above-described method is subjected to suction filtration, is followed by thorough washing with a 1 mole aqueous hydrochloric acid solution and acetone. The mixture is then suspended in 28 wt. % aqueous ammonia and the suspension is stirred for 5 minutes, whereby a polyaniline represented by the following chemical formula (2) is obtained.

Formula (2):

wherein, "n" indicates an integer in a range of 2–5000, "x" and "y" are the numbers which simultaneously satisfy the following equations: x+y=1 and 0≦y≦0.5.

In the next place, generation of super oxide as an active oxygen and conversion of super oxide into hydrogen peroxide when the synthesized polyaniline is used, are studied.
(Detection of Super Oxide (.O$_2$—))

For detection of super oxide, "Luminescencer AB-2100" (manufactured by ATTO Corporation) is employed. A suitable amount of aniline powder obtained by the above-described polyaniline synthesis process 1 is weighed on a black 96-well plate (hereinafter, referred to as "well plate" simply) attached to the Luminescencer.

Through an option pump for the Luminescencer, 100 μl of a 25 mmol/l imidazole buffer of pH 7.0 is poured into the well plate. Rightly after pouring, a TDPO-Pyrene solution, which emits light in response to super oxide, is poured into the well plate through a standard pump of the Luminescencer. The light emitting amount (counts) is then measured and determined as the generation amount of super oxide. Measurement is conducted in a similar manner by changing the addition amount of the polyaniline to the well plate.

Figure 1:
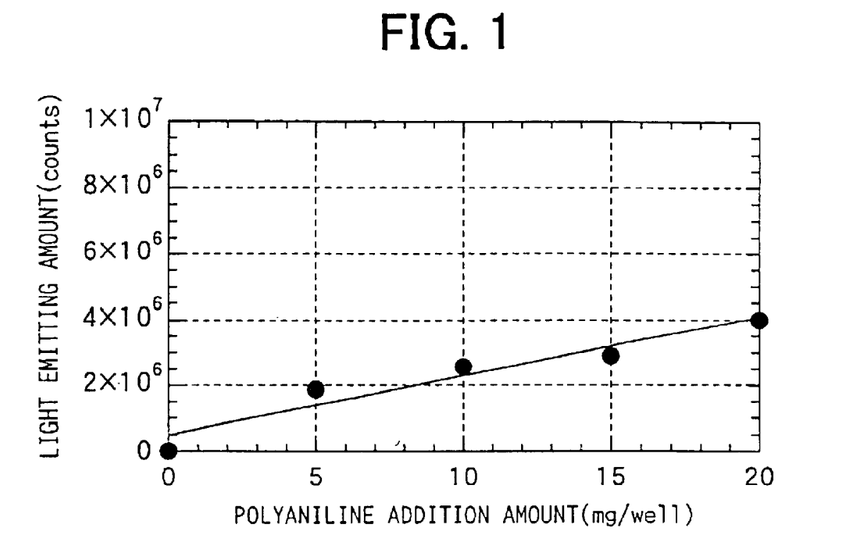
FIG. 1 is a graph illustrating the formation of super oxide by a polyaniline according to a preferred embodiment of the present invention.

The results are shown in FIG. 1. In FIG. 1, the addition amount of the polyaniline is plotted along the abscissa. Its unit is the mass of polyaniline (expressed by mg/well) in one well plate. Light emitting amount (counts) is plotted along the ordinate. From FIG. 1, it can be confirmed that the greater the amount of the polyaniline, the greater the light emitting amount, and therefore the generation amount of super oxide increases. Accordingly, oxygen dissolved in the imidazole buffer is activated by the polyaniline, and the super oxide is generated certainly.
(Detection of Hydrogen Peroxide)

A suitable amount of polyaniline powder obtained by the above-described polyaniline synthesis process 1 is weighed in a 100 ml beaker, 10 ml of pure water is added, and is followed by stirring. Stirring is conducted for 10 minutes, 1 hour and 24 hours, and the concentration of hydrogen peroxide is measured by changing the concentration of the polyaniline. For determination of hydrogen peroxide, peroxidase enzyme method is employed.

Figure 2:
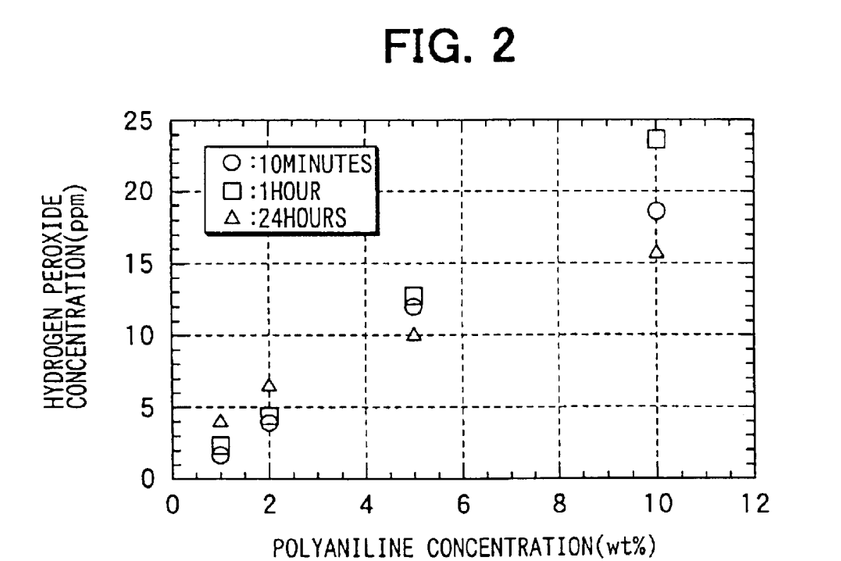
FIG. 2 is a graph illustrating the generation of hydrogen peroxide by a polyaniline according to the embodiment.

Results are shown in FIG. 2. In FIG. 2, the concentration (wt. %) of the polyaniline is plotted along the abscissa, while the concentration (ppm) of hydrogen peroxide is plotted along the ordinate. The plot indicated by a white circle is the result after 10-minute stirring, the plot indicated by a white square is the result after 1-hour stirring, and the plot indicated by a white triangle is the result after 24-hour stirring.

From the results, it has been confirmed that the greater the amount of the polyaniline, the higher the concentration of hydrogen peroxide. It has been found that, similar to the detection result of super oxide, oxygen dissolved in pure water is activated by the polyaniline and super oxide is formed apparently.

It has also been found that the longer the stirring time is, the higher the concentration of hydrogen peroxide is, and a capacity of generating active oxygen can be maintained over long hours. The concentration of hydrogen peroxide shows a decrease upon 24-hour stirring, compared with 10-min stirring, because the generated hydrogen peroxide is decomposed.

The reason, why the amount of active oxygen generated in pure water is studied using the generation amount of hydrogen peroxide as an index, is based on the principle that hydrogen peroxide is generated from super oxide by disproportionation.

A heat exchanger or condensed water is contaminated by odor components or organic substances such as microorganisms or viruses attached to the surface of the heat exchanger. An object of the present invention is to prevent this contamination. In this embodiment, this object is attained by making use of the capacity of a polyaniline to generate active oxygen. In the next place, sterilizing performance will be described as one example of the capacity of this polyaniline to decompose an organic substance.
(Sterilizing Performance)

The powdery polyaniline obtained in the above-described polyaniline synthesis process 1 is added to a culture containing about 10000 cells/ml of *Escherichia coli*. By changing the concentration of the polyaniline, a change in the viable count is measured with the passage of time by a colony measuring method. Results are shown in FIG. 3.

Figure 3:
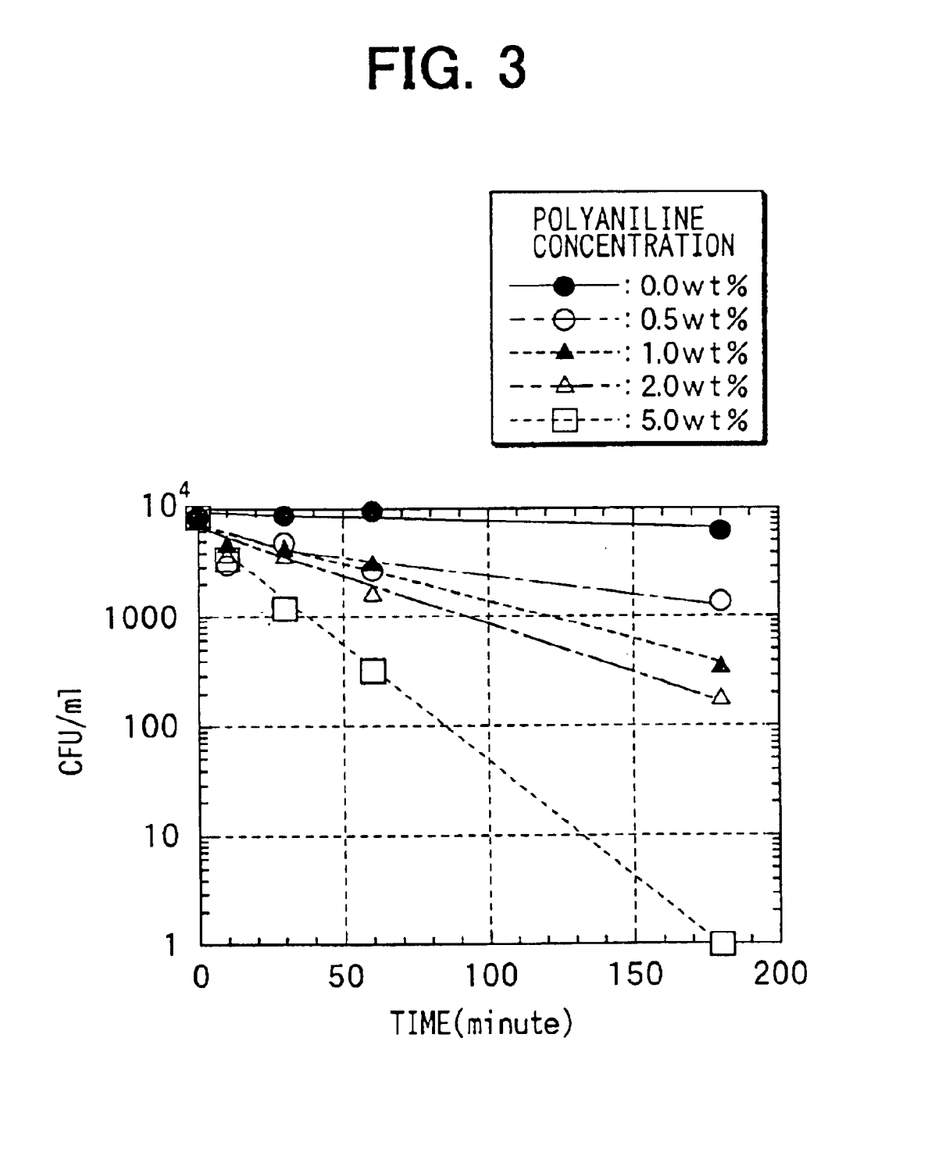
FIG. 3 is a graph showing sterilizing performance of a polyaniline according to the embodiment.

In FIG. 3, the passage of time (minute) after addition of polyaniline is plotted along the abscissa, while the concentration of the microorganism (CFU/ml) is plotted along the ordinate. In this diagram, the black circle indicates the result of a comparison example free of polyaniline. The plots indicated by white circle, black triangle, white triangle and white square are the using results of polyaniline in the concentrations of 0.5 wt. %, 1.0 wt. %, 2.0 wt. % and 5.0 wt. %, respectively.

As is apparent from FIG. 3, it has been confirmed that by the addition of the polyaniline, the viable count shows a decrease (decomposition of bacteria) with the passage of time. It has also been understood that the higher the concentration of the polyaniline, the higher the sterilizing effects.

As described above, it has been found that in the synthesized polyaniline, when water having oxygen dissolved therein contacts the polyaniline, the dissolved oxygen becomes active oxygen and this active oxygen reduces the number of *Escherichia coli*, which is one of organic substances.

Figure 4:
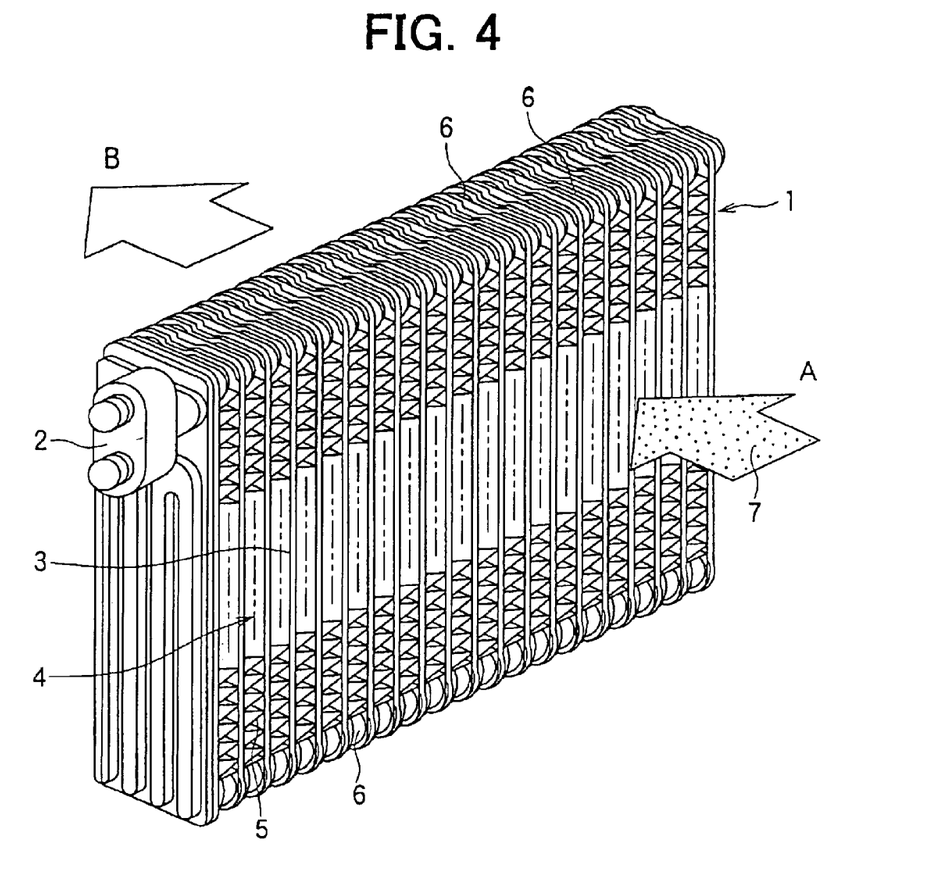
FIG. 4 is a perspective view illustrating a heat exchanger according to the embodiment.

In the next place, a heat exchanger and contamination preventing method of a heat exchanger, each making use of such a polyaniline will be described. Here, it is applied to a heat exchanger of an automotive air conditioner. FIG. 4 is a perspective view illustrating one example of a heat exchanger 1 for an automotive air conditioner. This heat exchanger 1 is disposed in a cooling unit case of a not-illustrated automotive air conditioner, while maintaining its upside and downside as the diagram.

The heat exchanger 1 is equipped with a pipe joint 2 disposed at one end thereof in the horizontal direction, and a heat exchange portion 4 for performing heat exchange between a liquid refrigerant passing through a liquid refrigerant passage inside of each of tubes 3 and air flowing outside the tubes 3. In the heat exchanger 1, a large number of the tubes 3 are disposed in parallel.

In this heat exchanging portion 4, a radiation fin 5 is bonded to an outside space between adjacent two tubes 3 in order to increase a heat conduction area on the air side. Each of the tubes 3 is communicated, at the upper and bottom portions thereof, with a tank 6, so that the refrigerant is circulated in each of the tubes 3 and the tanks 6 and flows out from the heat exchanger 1 through the pipe joint 2. Each of these parts of the heat exchanger 1 is made of aluminum.

On the surface of the heat exchanging portion 4 (corresponding to the metal base material in the claim) of the heat exchanger 1 having such a constitution, a film made of a polyaniline is formed. The polyaniline is provided on the heat exchange portion 4, for example, by dissolving the polyaniline in a suitable solvent such as N-methylpyrrolidone and then applying this solution onto the surface of the heat exchanging portion 4 of the heat exchanger 1. In this manner, the polyaniline is provided on the heat exchanging portion 4.

While the air conditioner is operated, air containing water vapor 7, shown by the arrow A in FIG. 4, passes through the heat exchanger 1 from the front of the automobile. When the air contacts the heat exchanging portion 4, its temperature decreases below its dew point, leading to conversion of the water vapor in the air into droplets. These droplets attach to the surface of the heat exchanging portion 4 as condensed water.

Figure 5:
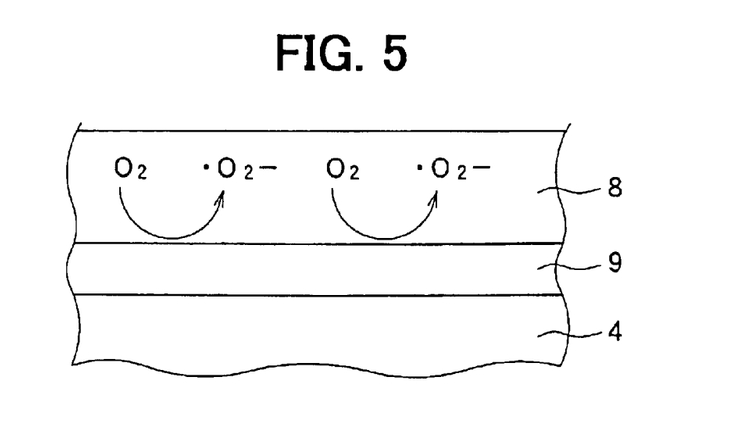
FIG. 5 is a schematic diagram showing a generation of the super oxide on a surface of the heat exchanger in FIG. 4.

FIG. 5 is a schematic view of the surface of this heat exchanging portion 4. As illustrated in FIG. 5, when the condensed water 8 attached onto the surface of the heat exchanging portion 4 contacts the film 9 made of a polyaniline, the polyaniline reduces dissolved oxygen ($O_2$) in the condensed water 8 (in other words, donates electrons to the dissolved oxygen), so that super oxide anion radical ($O_2^-$), which is an active oxygen, appears. This active oxygen decomposes odor components or organic substances such as microorganisms and bacteria in the condensed water 8.

As a result, air after passing through the heat exchanger 1, which is shown by an arrow B in FIG. 4, becomes deodorized and sterilized, and a clean air is discharged from the air port in the automotive.

According to this embodiment, active oxygen can be generated by bringing the dissolved oxygen in the condensed water 8 into contact with the film 9 in accordance with a simple method of only forming the film 9 made of a polyaniline on the surface of the heat exchanging portion 4 without disposal of any extra equipment. By oxidizing action of the generated active oxygen, *Escherichia coli* adhered onto the surface of the heat exchanging portion 4 can be decomposed. Thus, organic substances such as microorganisms and viruses adhered on the surface of the heat exchanger can be reduced by an inexpensive method without equipment extension.

This sterilization is effected by active oxygen generated by bringing the polyaniline into contact with condensed water. When the air conditioner is stopped and the heat exchanger 1 is not operated, the condensed water evaporates by the air passing through the heat exchanger 1 and the surface of the heat exchanging portion 4 becomes dry. In this case, generation of active oxygen is terminated automatically.

In addition, when the polyaniline is dried, its active-oxygen generating capacity is regenerated. By drying the heat exchanging portion 4, the polyaniline dries, thereby regenerating its active-oxygen generating capacity, which enables repeated use of it.

The method to form the polyaniline on the heat exchanging portion 4 is not limited to the above-described one, but the following method can also be adopted. First, the polyaniline is dissolved in a suitable aqueous solution. More specifically, after introduction of a hydrophilic functional group such as sulfonic acid to the polyaniline, the resulting polyaniline is dissolved in water. The polyaniline can be mixed with a proper binder.

The polyaniline is borne on the heat exchanging portion by immersing the heat exchanging portion 4, as a metal base material, of the heat exchanger in the liquid containing this polyaniline (aqueous solution or mixture with binder) or spraying the liquid to the heat exchanging portion 4. Another method can also be adopted for bearing the polyaniline on the heat exchanging portion 4.

As the metal base material, the radiation fin 5 or the tube 3 made of aluminum is described. However, chromium, silicon or copper can be used for the metal base material.

In the next place, synthesis of a polyaniline by electrolytic polymerization will be described. The following is the synthesis process of the polyaniline.

(Polyaniline Synthesis Process 2)

In an aqueous solution containing 0.2 mole of aniline and 0.5 mole of sulfuric acid, an aluminum plate, a platinum plate and a standard calomel electrode are provided as a working electrode, a counter electrode and a reference electrode, respectively. By using a potentiostat, 1.2V of controlled potential is applied to the working electrode based on the standard calomel electrode. The aluminum plate has a 30 mm square plane with 1 mm thickness.

After about 10 minutes after application, a green film of the polyaniline represented by the above-described chemical formula (1) is formed on the aluminum plate. The film is washed thoroughly with pure water and then immersed in a 1 wt. % aqueous solution of sodium carbonate, so that a film of the polyaniline represented by the above-described formula (2) is obtained. A description will next be made of a sterilizing performance of this polyaniline.

(Sterilizing Performance)

As in the above-described polyaniline synthesis process 2, an aluminum plate of 15 mm square and 1 mm thick having the polyaniline borne thereon is formed. To the aluminum plate, 100 μl of a suspension of *Escherichia coli* having a concentration of about 1000 cells/ml is added. The aluminum plate is then covered with a 30 mm square vinyl sheet so that the culture solution of *Escherichia coli* contacts the whole portion of the aluminum plate. A time-dependent change in the viable count is studied by the colony measuring method. The results are shown in FIG. 6.

Figure 6:
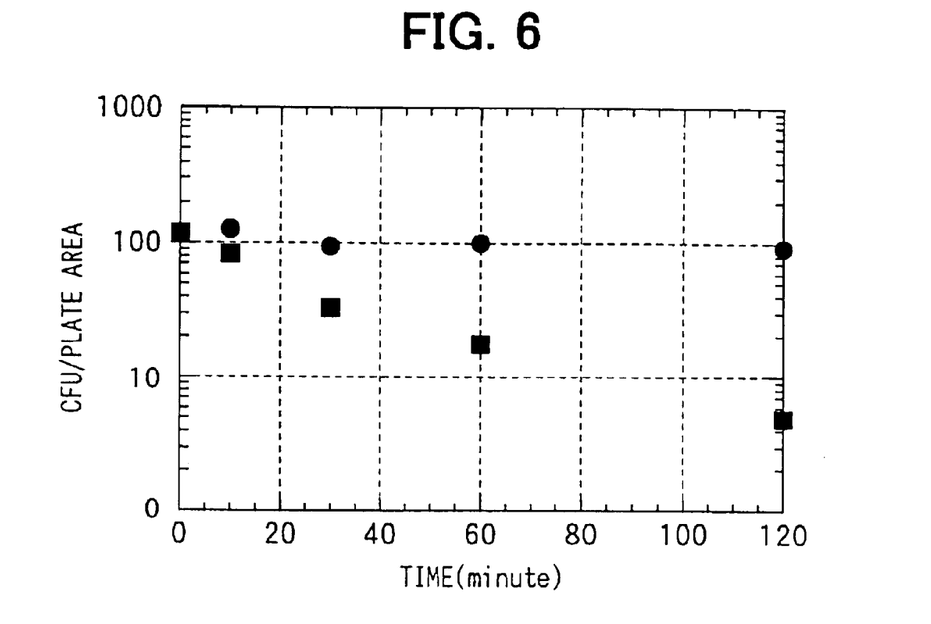
FIG. 6 is a graph showing the sterilizing performance of an another polyaniline according to the embodiment.

In FIG. 6, the time (minutes) is plotted along the abscissa, while the viable count (CFU/aluminum plate area) per one aluminum plate was plotted along the ordinate. In the diagram, the plot of a comparative example is indicated by a black circle. In comparative example, an aluminum plate having no polyaniline is employed. The plot indicated by black square shows the results of the aluminum plate having the polyaniline borne thereon.

From FIG. 6, it has been confirmed that the viable count decreases with the passage of time, suggesting that sterilization occurs by the addition of the polyaniline.

When the synthesis process of this embodiment is adopted, the polyaniline can be electrodeposited on the surface of the heat exchanging portion 4 by using the heat exchanging portion 4 of the heat exchanger 1 as the working electrode of the polyaniline synthesis process 2. And as in the embodiment, by converting the dissolved oxygen in the condensed water into active oxygen, the amount of organic substances attached to the heat exchanger 1 can be reduced.

The sterilizing performance of the polyaniline is mainly described next. The deodorizing/decomposing performance of the polyaniline will next be described based on the studying results on it by forming a polyaniline on the surface of a honeycomb member made as a model of the heat exchanging portion of the heat exchanger. First, a polyaniline synthesis process used for measurement of this deodorizing/decomposing performance is described.

(Polyaniline Synthesis Process 3)

A honeycomb member made of alumina and being a rectangular parallelepiped of 30 mm×30 mm×10 mm is immersed in 30 ml of a cooled aqueous solution containing 0.1 mole of aniline and 1 mole of hydrochloric acid. Then, 5 ml of a 1 mole aqueous hydrochloric acid solution containing 1.2 g of ammonium persulfate, which has also been cooled, is added. While cooling for about 1 hour, it is allowed to stand, so that the polyaniline represented by the above-described formula (1) is formed on the surface of the alumina inside of the pores of honeycomb made of alumina.

After thorough washing of this honeycomb with pure water, it is immersed in a 1 wt. % aqueous solution of sodium carbonate, whereby the polyaniline is converted into that represented by the above-described formula (2). An extra polyaniline adhered to the surface of the honeycomb is removed by an air gun. The amount of the polyaniline borne on the honeycomb by this synthesis process is about 0.2 g. The deodorizing/decomposing performance of this polyaniline will next be described.

(Deodorizing/Decomposing Performance)

The aluminum-made honeycomb having the polyaniline which have been obtained by the above-described polyaniline synthesis process 3, is put into a 10-liter Tedlar sampling bag for measurement of odor component. In this Tedlar sampling bag, 10 liter of a methyl mercaptan gas adjusted to 10 ppm by using oxygen is poured as an odor component.

From the gas sampling port of the Tedlar sampling bag, water is sprayed to the polyaniline-bearing honeycomb through an injector. The concentration of the methyl mercaptan gas and formation of an oxide are analyzed with the passage of time by gas chromatography.

Figure 7:
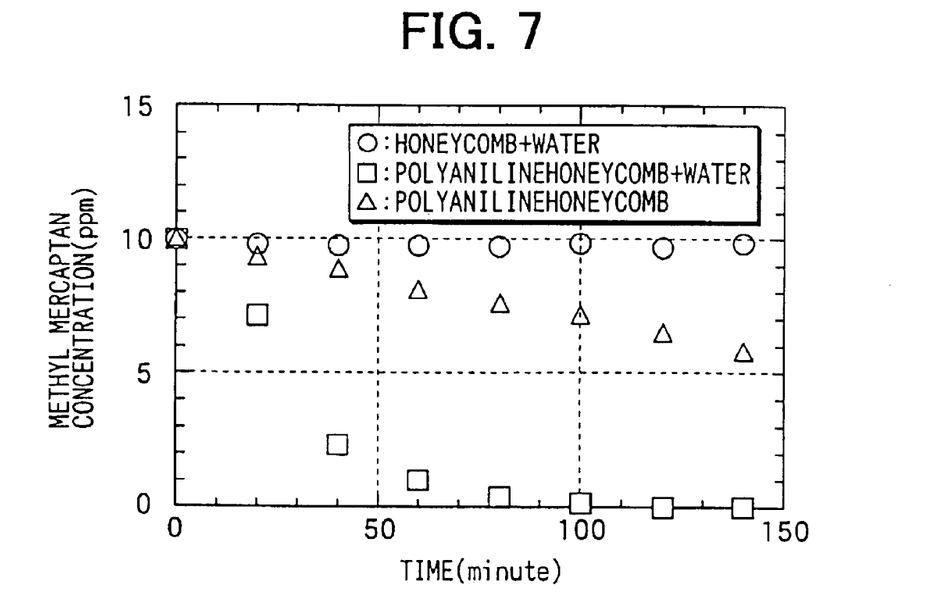
FIG. 7 is a graph showing deodorizing performance of a polyaniline according to the embodiment.

The results are shown in FIG. 7. In FIG. 7, the time (minutes) is plotted along the abscissa, while the concentration (ppm) of methyl mercaptan is plotted along the ordinate. Indicated by a white circle is the plot of the results of comparative example wherein water is sprayed to the honeycomb having no polyaniline. Indicated by a white square is a plot of the results of spraying water to the polyaniline-bearing honeycomb. Indicated by a white triangle is a plot of the polyaniline-bearing honeycomb not sprayed with water.

From the above-described results, it has been confirmed that a methyl mercaptan odor is removed with the passage of time by the addition of water to the polyaniline. Accordingly, it is understood that the polyaniline formed on the surface of the heat exchanger is effective for deodorization.

In the next place, synthesis processes of polyanilines represented by the below-described chemical formula (3) and formula (4) will next be described.

Formula (3):

Formula (4):

wherein, "A" indicates an anion, "n" indicates an integer in a range of 2–5000, "x" and "y" are the numbers which simultaneously satisfy the following equations: $x+y=1$ and $0 \leq y \leq 0.5$.

(Polyaniline Synthesis Process 4)

In an aqueous solution containing 0.1 mol/l of aniline, 0.5 mol/l of sulfuric acid, 0.2 mol/l of sodium sulfate and 0.3 mol/l of pyridine, a platinum plate, a stainless plate and a standard calomel electrode are used as a working electrode, a counter electrode and a reference electrode, respectively. To the working electrode, 0.7V of controlled potential is applied based on the standard calomel electrode. After about 40 minutes after application, a green polyaniline film is formed on the platinum plate.

The film is washed thoroughly with water and then immersed in an aqueous solution containing 0.5 mol/l of sulfuric acid and 0.2 mol/l of sodium sulfate to make the potential of it to be equal to that of the standard calomel electrode. In this manner, a pale yellow polyaniline represented by the above-described formula (3) is synthesized.

(Polyaniline Synthesis Process 5)

A 1 mol/l aqueous hydrochloric acid solution (800 ml) containing 183.4 g of ammonium persulfate, which solution has been cooled, is added into 1200 ml of a 1 mol/l aqueous hydrochloric acid solution containing 74.4 g of aniline, which solution has also been cooled, over at least one minute while stirring in a nitrogen gas atmosphere. The reaction mixture is then stirred at 5° C. for 1.5 hours.

The formed precipitate thus formed is filtered off, and is followed by washing with 1 mol/l hydrochloric acid, whereby a polyaniline having a dopant ratio (protonation ratio) of 0% is obtained. The resulting polyaniline is added to a 20 vol. % methanol solution of hydrazine 2 hydrate, and is followed by stirring for 3 hours. After filtration of the precipitate in the solution, the residue is washed and then, dried under reduced pressure, whereby the polyaniline represented by the above-described formula (4) is synthesized.

It has been confirmed that the above-described sterilizing performance and the deodorizing/decomposing performance are exhibited when the polyanilines of the above-described chemical formulas (3) and (4) are employed.

Figure 8:
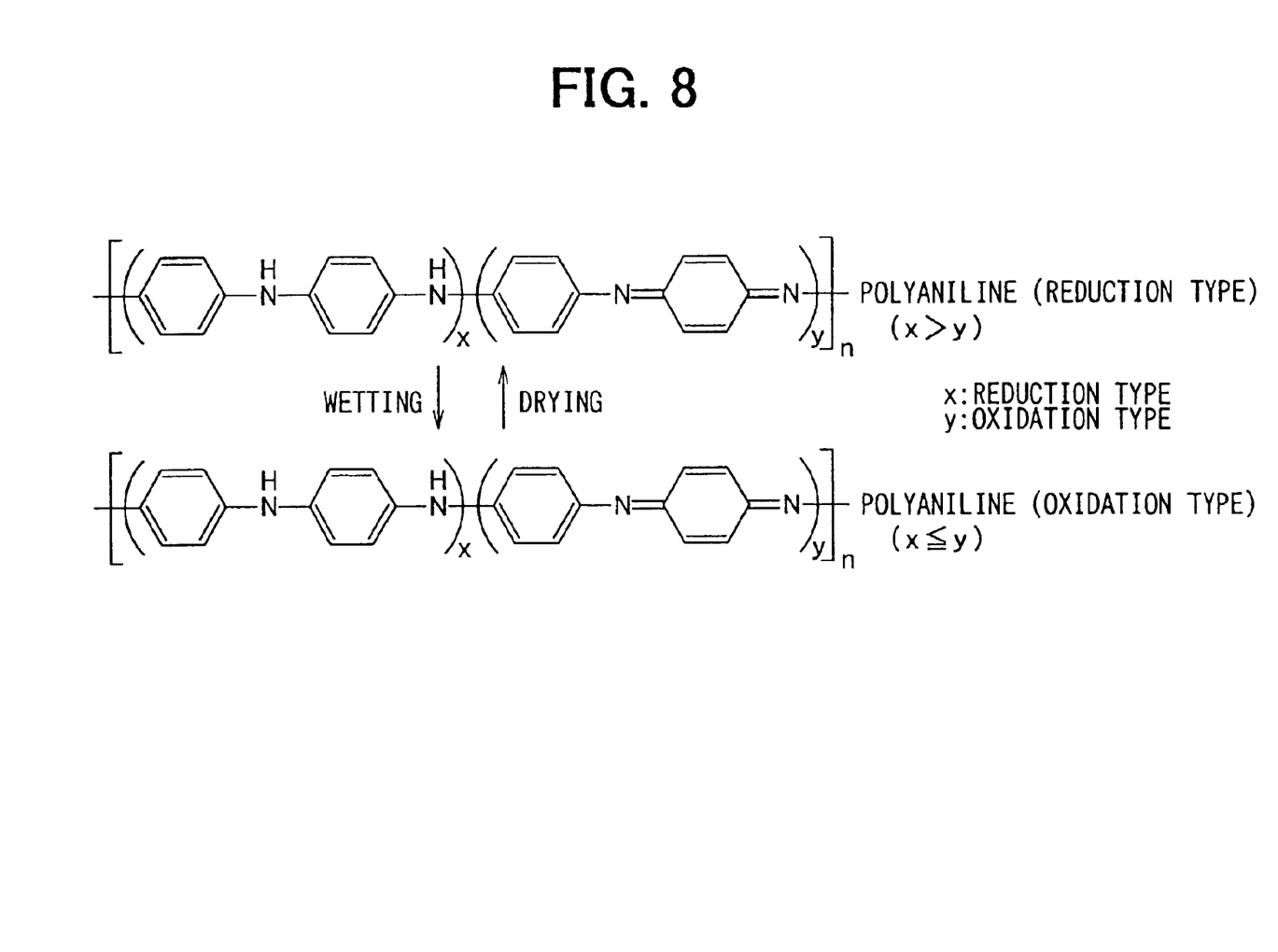
FIG. 8 is a view illustrating chemical change of a polyaniline.

As shown in FIG. 8, a polyaniline is changed between an oxidation type and a reduction type reversibly when the redox equilibrium is destroyed by wetting or drying. Accordingly, the present inventors invent the method for preventing the contamination of the heat exchanger 1 using the chemical change of the polyaniline.

According to the present invention, for preventing contamination of the heat exchanger 1, the film 9 which generates an active oxygen when contacting water is provided on the surface of the heat-exchanging portion 4 of the heat exchanger 1, thereby generating an active oxygen. Accordingly, it is possible to generate active oxygen simply by forming the film on the surface of the metal base material (heat exchanging portion) 4, and by bringing the film 9 into contact with oxygen dissolved in water existing around the film 9. Oxidizing action of the generated active oxygen serves to decompose the organic substances adhered onto the surface of the heat exchanging portion 4. As a result, it is possible to reduce the amount of organic substances at a low cost without equipment extension.

In this embodiment, it is possible to generate the active oxygen by bringing condensed water 8, which has been generated on the surface of the heat exchanging portion 4 by the operation of the heat exchanger, into contact with the film 9, and by activating oxygen dissolved in the condensed water 8. On the other hand, when the condensed water 8 is dried to prevent contact of the film 9 with the condensed water 8, generation of the active oxygen is terminated. At the same time, by drying the surface of the heat exchanging portion 4, an active-oxygen generating capacity can be regenerated. This makes it possible to use the film 9 in repetition.

According to this embodiment of the present invention, the film 9 can be made of an electron donating polymer. Thus, it possible to donate electrons to the oxygen dissolved in water, particularly, in the condensed water 8, thereby converting the oxygen into active oxygen. Further, as the electron donating polymer, a polyaniline or a derivative thereof can be used. More specifically, an electron donating polymer made of a polymer containing at least one of the polyanilines represented by the above-described formulas (1) to (4) is usable.

The term "active oxygen" as used herein means oxygen having markedly high activity as compared with ordinary oxygen and being apt to cause chemical reaction. Specific examples include single-state oxygen, super oxide anion radical ($.O_2^-$), hydroxy radical ($.OH$), super hydroxy radical ($.OOH$) and hydrogen peroxide.

Although the present invention has been fully described in connection with the preferred embodiment thereof with reference to the accompanying drawings, it is to be noted that various changes and modifications will become apparent to those skilled in the art.

For example, in addition to the synthesis processes shown in the above-described embodiment, a polyaniline can be synthesized in a known manner, for example, chemical synthesis by using an oxidizing agent or electrochemical synthesis. In the above-described embodiments, the polyaniline of the chemical formula (2) is synthesized from the polyaniline of the chemical formula (1), but the polyaniline of the chemical formula (1) can be used as a film. A polymer of an aniline derivative such as aminobenzenesulfonic acid can also be employed.

A film to be formed on the surface of the heat exchanger is not limited to that made of a polyaniline insofar as it has a capacity of generating active oxygen. Electron donating polymers, for example, benzene cyclocondensed compounds such as aniline black, polypyrrole, polythiophene and polyacetone may be used instead.

In the above-described embodiments, the present invention is applied to a heat exchanger of an air conditioner, but the present invention can also be applied to a refrigerator or dehumidifier.

Such changes and modifications are to be understood as being within the scope of the present invention as defined by the appended claims.

What is claimed is:

1. A method for preventing contamination of a heat exchanger made of a metal base material, the heat exchanger being installed in an air conditioner and being used for cooling air by a refrigerant supplied to the heat exchanger, the method comprising:

providing a film on an external surface of the heat exchanger, the film generating an active oxygen when contacting water;

supplying the refrigerant to the heat exchanger to make the heat exchanger cooler than air to be cooled;

condensing water on the external surface of the heat exchanger on which the film is provided so that the film contacts with the condensed water;

generating active oxygen in the condensed water by the film; and reducing an amount of organic substances adhered onto the external surface of the heat exchanger by using the generated active oxygen.

2. The method for preventing contamination of a heat exchanger according to claim 1 wherein the generating step is performed by the film by activating oxygen dissolved in the condensed water.

3. The method for preventing contamination of a heat exchanger according to claim 2, further comprising:

terminating the generation of the active oxygen by preventing the contact between the film and the condensed water by drying the external surface of the heat exchanger.

4. The method for preventing contamination of a heat exchanger according to claim 2, further comprising:

regenerating active oxygen generating capacity by preventing the contact between the film and the condensed water by drying the external surface of the heat exchanger.

5. The method for preventing contamination of a heat exchanger according to claim 4, wherein the regenerating step is repeatedly performed in accordance with an operation of the air conditioner.

6. The method for preventing contamination of a heat exchanger according to claim 5, wherein the regenerating step is performed when the air conditioner is stopped.

7. The method for preventing contamination of a heat exchanger according to claim 1, wherein the metal base material is made of aluminum.

8. The method for preventing contamination of a heat exchanger according to claim 1, wherein the film is made of an electron donating polymer.

9. The method for preventing contamination of a heat exchanger according to claim 8, wherein the electron donating polymer is made of a polyaniline or a derivative of the polyaniline.

10. The method for preventing contamination of a heat exchanger according to claim 9, wherein the polyaniline is made of a polymer containing at least one of polyanilines represented by the following chemical formulas (1) to (4):

formula (1):

-continued formula (2):

formula (3):

formula (4):

wherein, "A" indicates an , "n" indicates an integer in a range of 2–5000, "x" and "y" are the numbers which simultaneously satisfy the following equations: $x+y=1$ and $0 \leq y \leq 0.5$.

11. A heat exchanger made of a metal base material, the heat exchanger being installed in an air conditioner and being used for cooling air by a refrigerant supplied to the heat exchanger, the heat exchanger comprising:

an external surface where a condensed water is generated when the refrigerant is supplied to the heat exchanger to make the heat exchanger cooler than air to be cooled; and a film provided on the external surface of the heat exchanger in a manner that the condensed water generated on the external surface comes in contact with the film, wherein the film generates an active oxygen in the condensed water, and the generated active oxygen in the condensed water reduces an amount of odor components or organic substances adhered onto the external surface of the heat exchanger.

12. The heat exchanger according to claim 11, wherein the metal base material is made of aluminum.

13. The heat exchanger according to claim 11, wherein the film is made of an electron donating polymer.

14. the heat exchanger according to claim 13, wherein the electron donating polymer is a polyaniline or a derivative thereof.

15. The heat exchanger according to claim 14, wherein the polyaniline is made of a polymer containing at least one of polyanilines represented by the following chemical formulas (1) to (4), formula (1):

-continued formula (2):

formula (3):

formula (4):

wherein, "A" indicates an anion, "n" indicates an integer in a range of 2–5000, "x" and "y" are the numbers which simultaneously satisfy the following equations: $x+y=1$ and $0 \leq y \leq 0.5$.

16. The heat exchanger according to claim 11, wherein the film is provided on the external surface to be dried when the air conditioner is stopped.

17. A heat exchanger for a vehicle air conditioner, the heat exchanger being used for cooling air by a refrigerant supplied to the heat exchanger, the heat exchanger comprising:

a heat exchanging portion in which a refrigerant flowing therein is heat-exchanged with air, the heat exchanging portion being made of a metal base material, the heat exchanging portion providing an external surface where condensed water is generated when the refrigerant is supplied to the heat exchanger to make the heat exchanger cooler than air to be cooled; and a film provided on the external surface of the heat exchanger in a manner that the condensed water generated on the external surface comes in contact with the film, wherein the film generates an active oxygen in the condensed water, and the generated active oxygen in the condensed water reduces an amount of odor components or organic substances adhered onto the external surface of the heat exchanger.

18. The heat exchanger according to claim 17, wherein the film is provided on the external surface to be dried when the air conditioner is stopped.

19. A method for deodorizing air supplied by an air conditioner, comprising:

providing a heat exchanger made of a metal base material, the heat exchanger being used for cooling air by a refrigerant supplied to the heat exchanger;

providing a film on an external surface of the heat exchanger, the film generating an active oxygen when contacting water;

supplying the refrigerant to the heat exchanger to make the heat exchanger cooler than air to be cooled;

condensing water on the external surface of the heat exchanger on which the film is provided so that the film contacts with the condensed water;

generating active oxygen in the condensed water by the film; and decomposing odor components in the condensed water by using the generated active oxygen so that deodorized air is supplied.

20. The method claimed in claim 19, further performing sterilizing air by further comprising the steps of:

decomposing organic substances such as microorganisms and bacteria in the condensed water by using the generated active oxygen.

21. The method claimed in claim 19, further comprising:

regenerating active oxygen generating capacity by preventing the contact between the film and the condensed water by drying the external surface of the heat exchanger.

22. The method claimed in claim 21, wherein the regenerating step is repeatedly performed in accordance with an operation of the air conditioner.

23. The method claimed in claim 22, wherein the regenerating step is performed when the air conditioner is stopped.

24. The method claimed in claim 19, wherein the metal base material is made of aluminum.

25. The method claimed in claim 19, wherein the film is made of an electron donating polymer.

26. The method claimed in claim 25, wherein the electron donating polymer is made of a polyaniline or a derivative of the polyaniline.

27. The method claimed in claim 26, wherein the polyaniline is made of a polymer containing at least one of polyanilines represented by the following chemical formulas (1) to (4):

formula (1):

formula (2):

formula (3):

formula (4):

wherein, "A" indicates an anion, "n" indicates an integer in a range of 2–5000, "x" and "y" are the numbers which simultaneously satisfy the following equations: x+y=1 and $0 \leq y \leq 0.5$.

* * * * *